(12) United States Patent
Wilson et al.

(10) Patent No.: US 10,277,634 B2
(45) Date of Patent: Apr. 30, 2019

(54) SYSTEM AND METHOD FOR PROVISIONING AND REGISTRATION

(71) Applicant: Interactive Intelligence Group, Inc., Indianapolis, IN (US)

(72) Inventors: Jamie P. Wilson, Mooresville, IN (US); Kevin Elliott King, Bargersville, IN (US)

(*) Notice: Subject to any disclaimer, the term of this patent is extended or adjusted under 35 U.S.C. 154(b) by 6 days.

(21) Appl. No.: 15/080,149

(22) Filed: Mar. 24, 2016

(65) Prior Publication Data
US 2016/0286517 A1 Sep. 29, 2016

Related U.S. Application Data

(60) Provisional application No. 62/139,149, filed on Mar. 27, 2015.

(51) Int. Cl.
*H04M 3/51* (2006.01)
*H04M 7/00* (2006.01)
*H04L 29/06* (2006.01)
*H04L 29/08* (2006.01)

(52) U.S. Cl.
CPC ........ *H04L 65/1006* (2013.01); *H04L 65/105* (2013.01); *H04L 65/1036* (2013.01); *H04L 65/1069* (2013.01); *H04L 65/1073* (2013.01); *H04L 67/1097* (2013.01); *H04L 67/16* (2013.01); *H04L 67/34* (2013.01); *H04M 3/51* (2013.01); *H04M 7/006* (2013.01)

(58) Field of Classification Search
CPC ......... H04W 12/06; H04W 4/00; H04W 8/22; H04L 65/1006; H04L 65/1069; H04L 65/105; H04L 63/08; H04L 65/104; H04L 67/16; H04L 67/34; H04M 3/51; H04M 7/009

See application file for complete search history.

(56) References Cited

U.S. PATENT DOCUMENTS

| | | |
|---|---|---|
| 2005/0015499 A1 | 1/2005 | Mayer |
| 2010/0023603 A1 | 1/2010 | Archer et al. |
| 2010/0054156 A1 | 3/2010 | DeHaan |

(Continued)

FOREIGN PATENT DOCUMENTS

EP 2800320 A1 11/2014

OTHER PUBLICATIONS

International Search Report and Written Opinion dated Jun. 24, 2016 in related PCT application PCT/US16/24038 (International filing date Mar. 24, 2016).

(Continued)

*Primary Examiner* — Charles N Appiah
*Assistant Examiner* — Margaret G Mastrodonato

(57) ABSTRACT

A system and method are presented for provisioning and registration of a device. A device in an environment, such as a contact center or enterprise setting, may need to provision to a cloud managed telephony network appliance. This appliance may be part of a grouping of multiple appliances where the contacted appliance does not comprise the device's configuration data for provisioning. In an embodiment, the appliance is able to communicate with the other appliances in the grouping via SIP to discover which appliance owns the device's configuration data, obtain the data, and send the configuration data to the device.

20 Claims, 3 Drawing Sheets

(56) References Cited

U.S. PATENT DOCUMENTS

| | | |
|---|---|---|
| 2012/0096162 A1 | 4/2012 | Cecilia Torralba et al. |
| 2012/0185578 A1 | 7/2012 | Perkuhn et al. |
| 2013/0212129 A1 | 8/2013 | Lawson et al. |
| 2014/0004827 A1* | 1/2014 | O'Leary .............. H04W 8/22 |
| | | 455/411 |

OTHER PUBLICATIONS

Extended European Search Report for Application No. 16773801.2, dated Jan. 23, 2018, 9 pages.
Australian Government Examination Report No. 1 for Application No. 2016243092, dated Aug. 3, 2018, 3 pages.
Canadian Office Action for Application No. 2,984,248, dated Aug. 23, 2018, 4 pages.
Korean Intellectual Property Office Action with English Translation for Application No. 10-2017-7031094, dated Dec. 14, 2018, 12 pages.

* cited by examiner

SYSTEM AND METHOD FOR PROVISIONING AND REGISTRATION

REFERENCE TO RELATED APPLICATION

The present application claims priority to U.S. provisional patent application 62/139,149, filed on Mar. 27, 2015, and titled SYSTEM AND METHOD FOR PROVISIONING AND REGISTRATION.

BACKGROUND

The present invention generally relates to telecommunications systems and methods, as well as telecommunications devices. More particularly, the present invention pertains to the provisioning and registration of the devices.

SUMMARY

A system and method are presented for provisioning and registration of a device. A device in an environment, such as a contact center or enterprise setting, may need to provision to a cloud managed telephony network appliance. This appliance may be part of a grouping of multiple appliances where the contacted appliance does not comprise the device's configuration data for provisioning. In an embodiment, the appliance is able to communicate with the other appliances in the grouping via Session Initiation Protocol (SIP) to discover which appliance owns the device's configuration data, obtain the data from the appliance that owns the device's configuration data, and send the configuration data to the device.

In one embodiment, a method is presented for provisioning a telecommunications device in a telecommunications system, wherein the system comprises the telecommunications device, wherein the telecommunications device is capable of communication with a plurality of cloud managed telephony network appliances, the method comprising the steps of: contacting, by the telecommunications device, a first cloud managed telephony network appliance from the plurality of cloud managed telephony network appliances, wherein the configuration data for the telecommunications device is unknown by the first cloud managed telephony network appliance; sending, by the first cloud managed telephony network appliance, an invite to the remainder of the cloud managed telephony network appliances from the plurality of cloud managed telephony network appliances; receiving, by the first cloud managed telephony network appliance, responses from each of the remainder of the cloud managed telephony network appliances from the plurality of cloud managed telephony network appliances, wherein at least one response corresponds to a cloud managed telephony network appliance which owns the configuration data of the device; and sending, by the first cloud managed telephony network appliance, the location of the cloud managed telephony network appliance which owns the configuration data of the telecommunications device.

In another embodiment, a method is presented for provisioning a device in a telecommunications system, wherein the system comprises the device, wherein the device is capable of communication with a plurality of cloud managed telephony network appliances, the method comprising the steps of: contacting, by the device, a first cloud managed telephony network appliance from the plurality of cloud managed telephony network appliances, wherein the cloud managed telephony network appliance does not comprise configuration data for the device; sending, by the first cloud managed telephony network appliance, an invite to the remainder of the cloud managed telephony network appliances from the plurality of cloud managed telephony network appliances; receiving, by the first cloud managed telephony network appliance, responses from each of the remainder of the cloud managed telephony network appliances from the plurality of cloud managed telephony network appliances; and sending, by the first cloud managed telephony network appliance, the location of the cloud managed telephony network appliance which owns the configuration data of the device, wherein if none of the cloud managed telephony network appliances own the configuration data of the device, informing the device.

DETAILED DESCRIPTION

Figure 1:
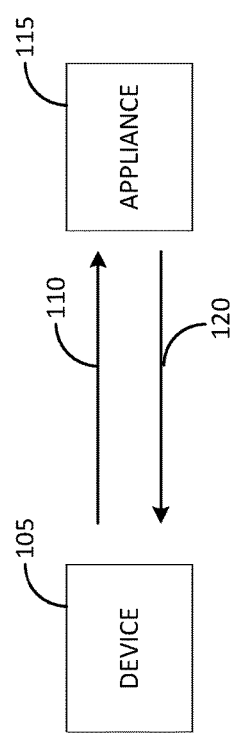
FIG. 1 is a diagram illustrating an embodiment of a single appliance deployment.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In a contact center environment, or another environment such as enterprise setting, a plurality of workstations may be present where agents or other workers perform their duties. The number of workstations present or the equipment associated with a workstation does not necessarily remain constant due to employment fluctuations, equipment changes, or even routine maintenance. Each workstation may comprise a communication device coupled to a network (such as a digital network, for example) which might require provisioning. Provisioning might occur upon initial device setup as well as when configuration changes occur. The communication device typically comprises a SIP device such as a soft phone or hard phones, such as desk or conference phones, as well as SIP enabled speakers, to name a few non-limiting examples. In an embodiment, the communication device may also comprise a mobile device. The mobile device may comprise a softphone which would need to provision or receive configuration data via a cloud public Application Programming Interface (API).

The communication device obtains provisioning data from a cloud managed telephony network appliance which owns the configuration for that device. A cloud managed telephony device may function through provisioning, proxy, media, etc., to incorporate applications, such as those used to operate a SIP device. While the device may be located on-premises, the appliance may be located in the cloud. SIP INVITES may be used for provisioning devices to appliances because it has built-in methods to refuse and redirect. SIP includes encryption, Quality of Service (QoS), and other features that make provisioning quick and efficient.

Appliances may be incorporated into groupings where a plurality may be interconnected through a network such as a LAN, or connected in such a way that the appliances are routable to each other. A plurality of the appliances may be utilized in an environment for redundancy and failsafe purposes. In an environment where multiple appliances are present, the provisioning process becomes more complicated as the generic definition of an appliance to which a particular device should obtain configuration data through is not as simplistic as a single appliance environment. The responsibility of instructing a device which particular appliance to provision against is placed on the appliance initially contacted in a grouping by the device. Association of a device with an appliance is not static, thus it is not always possible for a device to contact the correct appliance for provisioning data. Devices may initially be aware of appliances in a grouping with static options, such as Dynamic Host Configuration Protocol (DHCP) options, as well as Zero Touch Provisioning (ZTP) at manufacture time.

FIG. 1 is a diagram illustrating an embodiment of a single appliance deployment, indicated generally at 100. A device 105, such as a SIP phone, will attempt to provision against a cloud managed telephony network appliance which owns that particular device's configuration data. For example, the device 105 may attempt to provision against the appliance by using a simple HTTP request/response model. An HTTP GET userPhone request 110 may be sent to the appliance 115 which owns the configuration for the device 105. The appliance 115 may provide a response comprising a message body of the provisioning data 120.

Figure 2:
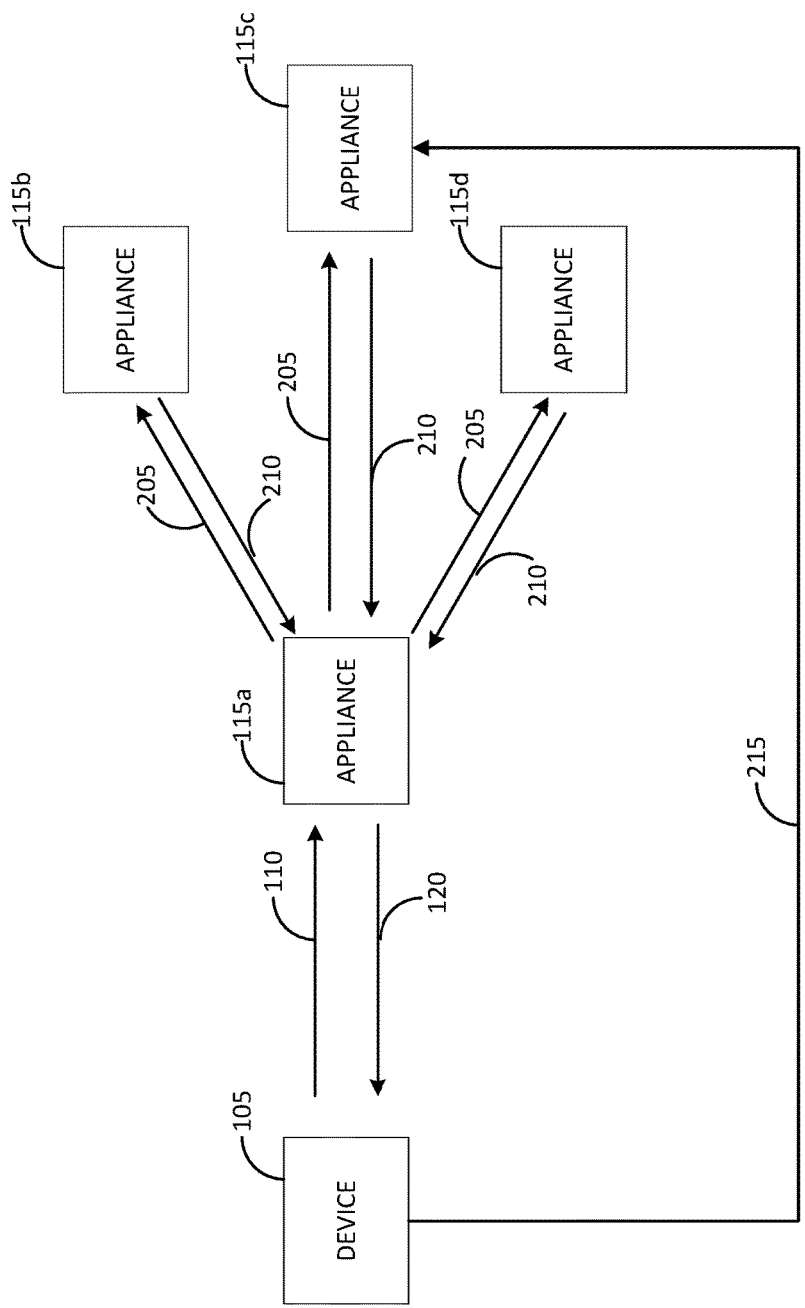
FIG. 2 is a diagram illustrating an embodiment of a multi-appliance deployment.

In scenarios where there are more than one appliance, such as a grouping, there becomes a 1/n chance of successfully requesting configuration data from the correct appliance. FIG. 2 is a diagram illustrating an embodiment of a multi-appliance deployment, indicated general at 200. The device 105 attempts to provision 110 against the incorrect cloud managed telephony network appliance 115a. This may be done through an HTTP GET request, which is sent to any one appliance within the grouping. In this example, the appliance 115a receives the request.

The appliance 115a does not recognize the device 105 nor have prior knowledge. The appliance 115a may then begin to search for the correct appliance which owns the provisioning data by sending out SIP INVITEs 205 to other appliances in the grouping. In this non-limiting example, Appliances 115a, 115b, 115c and 115d are illustrated, though any number may be present in the grouping.

Appliances 115b and 115d may return responses 210 that the device 105 is not found. If the appliance does not know about that device's configuration data, an industry standard 404 response code may be returned.

In an embodiment, a proxy logic allows a device to query off the appliance and that particular appliance may issue a request on behalf of the device to the correct appliance. The device doesn't know that it contacted the incorrect appliance, as a result.

Appliance 115c may return a response 210 that it owns the configuration for the device 105 to the appliance 115a. For example, the appliance which owns the configuration for the device might return an industry standard 301 SIP response with its own contact information in the Contact header of the SIP response. Appliance 115a may accumulate the SIP responses 120 from the other appliances 115b, 115c, and 115d and send the appropriate response 120 to the device 105.

Appliance 115a relays the message to the device 105 that appliance 115c has the configuration and the device 105 may attempt to provision against the appliance 115c by using a simple HTTP request/response model 215. The message may be relayed through a 301 response code and the Uniform Resource Identifier (URI) to the provision server of the appliance 115c in the "Location" header of the HTTP response.

In an embodiment, if no appliances own that device's configuration, the response 120 from the appliance 115a to the device 105 may comprise an industry standard 404 response.

Figure 3:
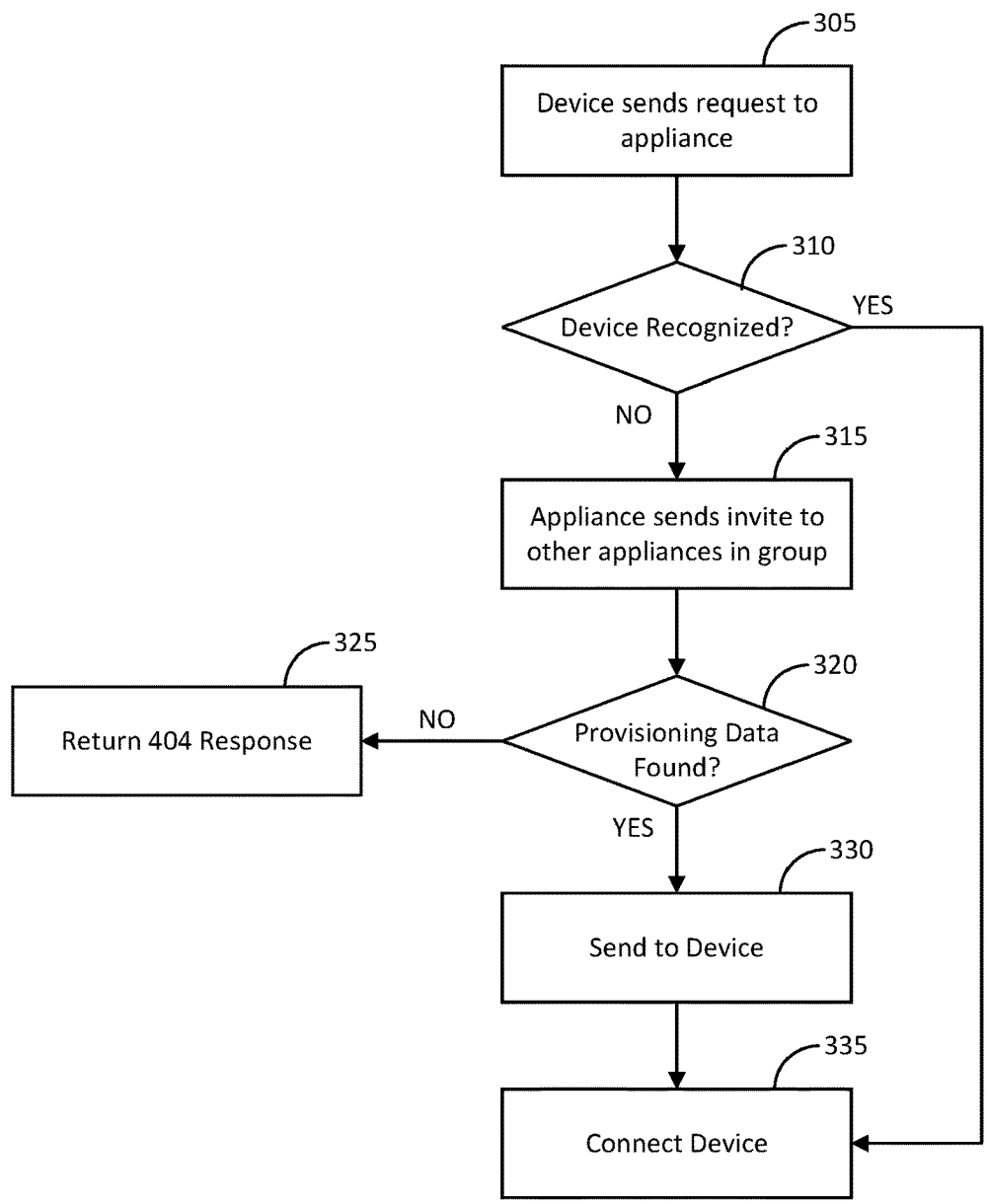
FIG. 3 is a flowchart illustrating a process for determining which appliance hosts a device's provisioning data.

FIG. 3 is a flowchart illustrating a process for determining which appliance from a grouping of appliances hosts the requesting device's provisioning data, indicated generally at 300.

In operation 305, a device sends a request to an appliance. For example, the request may be performed through an HTTP GET request, which is sent to any one appliance within the appliance grouping. In another embodiment, the device may issue another type of HTTP request, such as a PUT request. Control is passed to operation 310 and the process 300 continues.

In operation 310, it is determined whether or not the appliance recognizes the device. If it is determined that the appliance does not recognize the device, control is passed to operation 315 and the process 300 continues. If it is determined that the appliance recognizes the device, control is passed to operation 335 and the process 300 continues.

The determination in operation 310 may be made based on any suitable criteria. For example, each appliance was assigned and pushed device assignments by the cloud. The cloud performs a database lookup at device creation and each device is assigned a weighted random algorithm to spread devices across all appliances in the grouping evenly for load distribution purposes. In an embodiment, an appliance may only hold a finite number of device provisioning data locally without having to query the cloud. Association of a device with an appliance is also not static and thus, the provisioning data may change appliances due to load balancing, appliance removal, etc.

In operation 315, the contacted appliance sends a SIP INVITE to other appliances in the grouping. For example, using the previously illustrated example in FIG. 2, the appliance 115a may then begin to search for the correct appliance which owns the provisioning data by sending out SIP INVITEs 205 to other appliances in the grouping. The SIP INVITE may contain a URI parameter added to the request-URI indicating that the invite is a search URI for the correct appliance. Within the URI, the parameter name might be "provisionhunt" and the value comprises an identifying string for the respective device. Control is passed to operation 320 and the process 300 continues.

In operation 320, it is determined whether or not the device configuration data has been located. If it is determined that the device configuration data has not been located, control is passed to operation 325 and the process ends. If it is determined that the device configuration data has been located, control is passed to operation 330 and the process 300 continues.

The determination in operation 320 may be based on any suitable criteria. For example, responses from the other appliances in the grouping may be in the form of an industry standard 301 response code (standard re-direct) or an industry standard 302 response code (temporary or permanent redirect). The response may comprise its own IP and port of the provision server locally on that appliance in the "contact" header of the SIP response. Referring to the example illustrated in FIG. 2, the contacted appliance 115a may accumulate the SIP responses from the other appliances 115b, 115c, and 115d. Appliance 115c may return a response that it owns the configuration for the device 105 to the appliance 115*a* while appliances 115*c* and 115*d* may return responses that they have no knowledge of the device 105.

In operation 325, a "not found" response is sent to the device. For example, the appliance may return an industry standard 404 response code to the device, indicating that no provisioning data has been found and the process 300 ends.

In operation 330, the device provisioning data is sent to the device. For example, appliance 115*a* may relay the message to the device 105 that appliance 115*c* hosts the provisioning data. The message may be relayed through a 301 response code and the URI to the provision server of the appliance 115*c* in the "Location" header of the HTTP response Control is passed to operation 335 and the process 300 continues.

In operation 335, the device is connected and the process 335 ends. For example, the device 105 may attempt to provision against the appliance 115*c* by using a simple HTTP request/response model.

In another embodiment, a device may be provisioned against a service, such as Amazon Web Services Discovery Service first and then redirected to the correct appliance. In yet another embodiment, devices may be remotely hosted in cloud managed voice datacenters.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for provisioning a telecommunications device in a telecommunications system, the method comprising:
    receiving, by a processor at a cloud managed telephony network provisioning appliance from among a plurality of cloud managed telephony network provisioning appliances, a provisioning request from a telecommunications device from among a plurality of telecommunications devices;
    determining, by the processor, based on the provisioning request, that the telecommunications device is not recognized;
    transmitting, by the processor, a session initiation protocol (SIP) invite to one or more other appliances from among the plurality of cloud managed telephony network provisioning appliances, the SIP invite comprising a uniform resource identifier (URI) indicating the SIP invite is a search for determining which of the cloud managed telephony network appliances has provisioning data corresponding to the telecommunications device, wherein provisioning data for each of the plurality of telecommunications devices is spread across the plurality of cloud managed telephony network provisioning appliances according to a load distribution assignment;
    receiving, by the processor, a signal from each of the one or more other appliances from among the plurality of cloud managed telephony network provisioning appliances in response to the SIP invite, wherein the signal from one of the one or more other appliances from among the plurality of cloud managed telephony network provisioning appliances indicates the one of the one or more other appliances from among the plurality of cloud managed telephony network provisioning appliances has the provisioning data corresponding to the telecommunications device; and
    transmitting, by the processor, the provisioning data to the telecommunications device to enable the telecommunications device to electronically communicate with the one of the cloud managed telephony network appliances.

2. The method of claim 1, wherein the plurality of cloud managed telephony network appliances are in electronic communication with each other and configured to route signals to each other.

3. The method of claim 1, wherein the telecommunications device comprises a SIP device.

4. The method of claim 1, wherein the plurality of cloud managed telephony network appliances are configured to incorporate applications through provisioning, proxy, or media.

5. The method of claim 1, wherein the URI comprises an identifying string for the one of the cloud managed telephony network appliances.

6. The method of claim 1, further comprising initiating, by the processor, electronic communication between the telecommunications device and the one of the cloud managed telephony network appliances.

7. The method of claim 1, further comprising receiving, by the processor, a signal from each of the cloud managed telephony network appliances, other than the one of the cloud managed telephony network appliances, indicating the telecommunications device is not recognized.

8. The method of claim 1, further comprising transmitting, by the processor, location information corresponding to the one of the cloud managed telephony network appliances to the telecommunications device.

9. The method of claim 1, further comprising transmitting, by the processor, the provisioning data to the telecommunications device by way of a SIP response.

10. The method of claim 1, wherein the telecommunications device is operating as part of a contact center system and is remote with respect to the cloud managed telephony network appliances.

11. A system for provisioning a telecommunications device in a telecommunications system, the system comprising:
    a processor; and
    a memory coupled to the processor, wherein the memory stores instructions that, when executed by the processor, cause the processor to:
        receive, at a cloud managed telephony network provisioning appliance from among a plurality of cloud managed telephony network provisioning appliances, a provisioning request from a telecommunications device from among a plurality of telecommunications devices;
        determine, based on the provisioning request, that the telecommunications device is not recognized;
        transmit a session initiation protocol (SIP) invite to one or more other appliances from among the plurality of cloud managed telephony network provisioning appliances, the SIP invite comprising a uniform resource identifier (URI) indicating the SIP invite is a search for determining which of the cloud managed telephony network appliances has provisioning data corresponding to the telecommunications device, wherein provisioning data for each of the plurality of telecommunications devices is spread across the plurality of cloud managed telephony network provisioning appliances according to a load distribution assignment;

receive a signal from each of the one or more other appliances from among the plurality of cloud managed telephony network provisioning appliances in response to the SIP invite, wherein the signal from one of the one or more other appliances from among the plurality of cloud managed telephony network provisioning appliances indicates the one of the one or more other appliances from among the plurality of cloud managed telephony network provisioning appliances has the provisioning data corresponding to the telecommunications device; and transmit the provisioning data to the telecommunications device to enable the telecommunications device to electronically communicate with the one of the cloud managed telephony network appliances.

12. The system of claim 11, wherein the plurality of cloud managed telephony network appliances are in electronic communication with each other and configured to route signals to each other.

13. The system of claim 11, wherein the telecommunications device comprises a SIP device.

14. The system of claim 11, wherein the plurality of cloud managed telephony network appliances are configured to incorporate applications through provisioning, proxy, or media.

15. The system of claim 11, wherein the URI comprises an identifying string for the one of the cloud managed telephony network appliances.

16. The system of claim 11, wherein the instructions further cause the processor to initiate electronic communication between the telecommunications device and the one of the cloud managed telephony network appliances.

17. The system of claim 11, wherein the instructions further cause the processor to receive a signal from each of the cloud managed telephony network appliances, other than the one of the cloud managed telephony network appliances, indicating the telecommunications device is not recognized.

18. The system of claim 11, wherein the instructions further cause the processor to transmit location information corresponding to the one of the cloud managed telephony network appliances to the telecommunications device.

19. The system of claim 11, wherein the instructions further cause the processor to transmit the provisioning data to the telecommunications device by way of a SIP response.

20. The system of claim 11, wherein the telecommunications device is operating as part of a contact center system and is remote with respect to the cloud managed telephony network appliances.

* * * * *